(12) United States Patent
Forster (10) Patent No.: US 7,088,248 B2
(45) Date of Patent: Aug. 8, 2006

(54) SYSTEM AND METHOD FOR SELECTIVELY READING RFID DEVICES

(75) Inventor: Ian J. Forster, Chelmsford (GB)

(73) Assignee: Avery Dennison Corporation, Pasadena, CA (US)

( * ) Notice: Subject to any disclaimer, the term of this patent is extended or adjusted under 35 U.S.C. 154(b) by 159 days.

(21) Appl. No.: 10/807,954

(22) Filed: Mar. 24, 2004

(65) Prior Publication Data

US 2005/0212673 A1 Sep. 29, 2005

(51) Int. Cl.
*G08B 13/14* (2006.01)
*G06K 7/00* (2006.01)

(52) U.S. Cl. .................... 340/572.7; 340/572.3; 340/10.2; 340/928; 235/385; 455/1

(58) Field of Classification Search ............ 340/572.1, 340/572.3, 572.7, 10.1, 10.2, 10.51, 928; 235/380, 384, 385; 455/1
See application file for complete search history.

(56) References Cited

U.S. PATENT DOCUMENTS

| | | | |
|---|---|---|---|
| 4,016,553 A * | 4/1977 | Novikoff et al. ......... 340/572.7 |
| 4,242,671 A * | 12/1980 | Plows ........................... 367/2 |
| 4,746,830 A * | 5/1988 | Holland ................. 310/313 D |
| 5,061,941 A * | 10/1991 | Lizzi et al. ................. 343/742 |
| 5,126,749 A * | 6/1992 | Kaltner ....................... 343/742 |
| 5,251,808 A * | 10/1993 | Rudd ....................... 229/101.2 |
| 5,300,875 A | 4/1994 | Tuttle |
| 5,450,492 A | 9/1995 | Hook et al. |
| 5,517,195 A * | 5/1996 | Narlow et al. ................ 342/51 |
| 5,874,724 A | 2/1999 | Cato ......................... 235/492 |
| 5,955,969 A * | 9/1999 | D'Hont ....................... 340/928 |
| 6,130,612 A * | 10/2000 | Castellano et al. ...... 340/572.6 |
| 6,340,932 B1 * | 1/2002 | Rodgers et al. .......... 340/572.7 |
| 6,392,544 B1 * | 5/2002 | Collins et al. ........... 340/572.7 |
| 6,393,045 B1 | 5/2002 | Belcher et al. |
| 6,424,262 B1 * | 7/2002 | Garber et al. ............ 340/572.3 |
| 6,429,768 B1 * | 8/2002 | Flick ........................... 340/5.2 |
| 6,703,935 B1 | 3/2004 | Chung et al. ............ 340/572.7 |
| 6,714,121 B1 | 3/2004 | Moore ........................ 340/10.3 |
| 6,726,099 B1 * | 4/2004 | Becker et al. ............... 235/380 |
| 6,737,986 B1 * | 5/2004 | Fuyama ..................... 340/928 |
| 6,744,367 B1 * | 6/2004 | Forster .................... 340/572.7 |
| 6,783,072 B1 * | 8/2004 | Acosta et al. .......... 235/462.13 |
| 6,894,616 B1 * | 5/2005 | Forster .................... 340/572.1 |
| 2003/0067414 A1 | 4/2003 | Cole et al. |

(Continued)

FOREIGN PATENT DOCUMENTS

EP 0968488 3/1998

(Continued)

*Primary Examiner*—Jeffery Hofsass
*Assistant Examiner*—Anne V. Lai
(74) *Attorney, Agent, or Firm*—Renner, Otto, Boisselle & Sklar, LLP (57) ABSTRACT

A radio frequency identification (RFID) device detection system includes an RFID device reader configured to detect RFID devices within a predetermined designated area, and two or more jamming signal transmitters configured to prevent the RFID device reader from detecting and reading devices outside of the designated area. The jamming signal transmitters may include a pair of low-frequency field generator loops driven out of phase with one another. RFID devices for use with the detection system may have a pair of antennas, one for detection by the RFID reading system, and another antenna for use in receiving signals from the jamming signal transmitters, in order to prevent communication with a wireless communication device such as an RFID chip, to which the antennas are coupled. The two antennas may be coupled to the RFID chip in parallel, with the antennas each coupled to the same contacts of the RFID chip.

40 Claims, 4 Drawing Sheets

U.S. PATENT DOCUMENTS

2004/0012496 A1* 1/2004 De Souza et al. ....... 340/572.3
2004/0100359 A1* 5/2004 Reade et al. ................. 340/5.2
2004/0212542 A1 10/2004 Rahim

FOREIGN PATENT DOCUMENTS

| EP | 0 968 488 | 12/2003 |
|---|---|---|
| JP | 2004-246816 | 9/2004 |
| WO | 93/05489 | 3/1993 |
| WO | WO 94/19781 | 9/1994 |
| WO | WO 2004/015625 | 2/2004 |
| WO | 2004/074873 | 9/2004 |
| WO | WO 2005/069208 | 7/2005 |

* cited by examiner

SYSTEM AND METHOD FOR SELECTIVELY READING RFID DEVICES

TECHNICAL FIELD OF THE INVENTION

The present invention relates to an antenna arrangement for a radio frequency identification (RFID) system for use in tracking packages and other articles in specified areas, such as on a portion of a conveyor belt. In addition, the present invention relates to a system for detecting RFID devices in specified areas. More specifically, the present invention relates to an RF reader array in combination with other devices that allow discrimination of multiple articles in the vicinity of the specified area.

DESCRIPTION OF THE RELATED ART

The use of a radio frequency identification (RFID) system to identify and monitor objects is well known in the art. In such a system RFID labels or tags, referred to collectively as "RFID devices", are attached or otherwise coupled to objects to be tracked or otherwise monitored. A conventional RFID device may utilize a gated antenna array that includes a pair of vertically mounted antennas. The vertically mounted antennas each produce and emit an electromagnetic interrogation field at a specific frequency when excited by suitable electronic circuitry. The interrogation fields together form an interrogation zone in which the RFID device can be interrogated and detected. If an RFID transponder is positioned within the interrogation zone for a sufficient time and is able to receive appropriate commands from the reading system as well as adequate RF power to operate the device, it will become stimulated and transmit, either by generation of a radio frequency signal or by reflective means, commonly described as modulated backscatter, a uniquely coded signal that is received by the antennas or a separate receiving antenna.

An attractive potential application of RFID systems is in tracking packages and other articles traveling on conveyors, for example in a distribution center. In order to identify and properly route individual packages traveling through a distribution center, it is necessary to provide and detect an identification code associated with each package. Traditionally, this has been done with printed bar codes, using bar code readers that may for example be placed over conveyor belts. When using such bar codes systems it is necessary to orient the packages with the bar codes facing upwardly, and otherwise to orient and place the packages on the conveyor belt so that the bar codes will be detected. This calls for manual labor, and for this reason it is attractive to consider the use of RFID labels that offer more flexible (non-line-of-sight) detection thus avoiding limitations on the orientation and placement of the packages.

An RFID transponder can be either an active transponder or a passive transponder. An active transponder has its own internal battery, whereas a passive transponder does not have its own internal battery and generates its required power through electromagnetic coupling to an interrogation field. Passive transponders are generally less expensive than active transponders. One traditional drawback of RFID systems which include passive transponders has been their relatively limited read range (i.e., relatively limited interrogation zone). However, there are major efforts underway to increase the reading range of passive RFID tags in order to make it possible to detect the tags at increasing distances from the readers.

In the case of detection of RFID tagged packages on a conveyor, improvements in reading distance of passive RFID tags may create another problem, however. The conveyor reader may simultaneously detect multiple tagged packages at one time, especially if such packages are located relatively close together on the conveyor. It is not desirable to turn the conveyor reader power down to reduce the reading range, as the position of a package and its contents can greatly attenuate the signal, making the reading unreliable at reduced power. Thus there is a need to discriminate between multiple detected packages according to their location on the conveyor.

SUMMARY OF THE INVENTION

According to an aspect of the invention, an RFID detection system includes jamming signal transmitters to inhibit detection of RFID devices outside of a specified area.

According to another aspect of the invention, an RFID detection system includes an RFID device reader and jamming signal transmitters operatively coupled to the reader, to aid the reader in avoiding detection of RFID devices outside of a predetermined specified area.

According to yet another aspect of the invention, a device for affecting operation of RFID devices includes a pair of spaced-apart loops for emitting low-frequency electromagnetic fields, wherein the fields are substantially opposite in phase.

According to still another aspect of the invention, an RFID device has a pair of antennas, wherein the antennas are configured to receive signals of different frequencies.

According to a further aspect of the invention, an RFID device has a pair of antennas, one for receiving higher frequency communication signals, and the other a loop antenna for receiving lower frequency jamming signals.

According to a still further aspect of the invention, an RFID device includes a pair of antennas both electrically coupled to electronics of the RFID device. One of the antennas is configured to interact with an RFID device reader, to allow detection of the RFID device. The other of the antennas is configured to allow for jamming of the RFID device, by receiving a signal that prevents interaction between the electronics and the RFID device reader.

According to another aspect of the invention, a method of selectively detecting RFID devices includes configuring an RFID device reader to read RFID devices within a specified area, and configuring jamming signal transmitters to inhibit detection of RFID devices outside the specified area.

According to a further aspect of the invention, an RFID device has a piezoelectric resonant element electrically coupled to antenna elements of the device.

According to a still further aspect of the invention, an RFID device includes a substrate that includes a piezoelectric material. The piezoelectric material may be mechanically and/or electrically coupled to antenna elements of the device.

According to another aspect of the invention, an RFID device includes a magnetic material that is mechanically coupled to antenna elements of the device.

According to still another aspect of the invention, an RFID device includes a magnetic material layer that is mechanically coupled to a piezoelectric material layer.

According to yet another aspect of the invention, a radio-frequency identification (RFID) device includes a chip; and first and second antennas operatively coupled to the chip. The antennas are configured to receive signals of different frequencies.

According to still another aspect of the invention, a system for detecting radio-frequency identification (RFID) devices includes an RFID device reader for detecting the RFID devices within a designated area; and a pair of jamming signal transmitters to prevent detection of RFID devices outside of the designated area.

According to a further aspect of the invention, a method for selectively detecting radio-frequency identification (RFID) devices, the method including: using jamming signal transmitters to inhibit operation of RFID devices outside of a designated area; and detecting RFID devices within the designated area.

According to a still further aspect of the invention, a radio-frequency identification (RFID) device includes a chip; and first and second antennas operatively coupled to the chip. The antennas are configured to receive signals of different frequencies.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative of but a few of the various ways in which the principles of the invention may be employed, however. Other objects, advantages and novel features of the invention will become apparent from the following detailed description of the invention when considered in conjunction with the drawings.

BRIEF DESCRIPTION OF DRAWINGS

In the annexed drawings, which are not necessarily to scale.

DETAILED DESCRIPTION

A radio frequency identification (RFID) device detection system includes an RFID device reader configured to detect RFID devices within a predetermined designated area, and a jamming system that includes two or more jamming signal transmitters configured to prevent the RFID device reader from detecting and reading devices outside of the designated area. The RFID device reader uses a communication signal to interact with RFID devices within the predetermined area. The jamming signal transmitters transmit a jamming signal to prevent interaction between the RFID device reader and RFID devices outside of the predetermined area. The jamming signal transmitters may include a pair of low-frequency field generator loops driven out of phase with one another. Additional jamming signal transmitters may be placed around the designated area, in order to jam RFID devices outside the designated area, in any of a variety of possible locations and orientations. RFID devices for use with the detection system may have a pair of antennas, one for detection by the RFID reading system, by interaction with the communication signal, and another antenna for use in receiving jamming signals from the jamming signal transmitters, in order to prevent communication with a wireless communication device such as an RFID chip, to which the antennas are coupled. The two antennas may be coupled to the RFID chip in parallel, with the antennas each coupled to the same contacts of the RFID chip.

Figure 1:
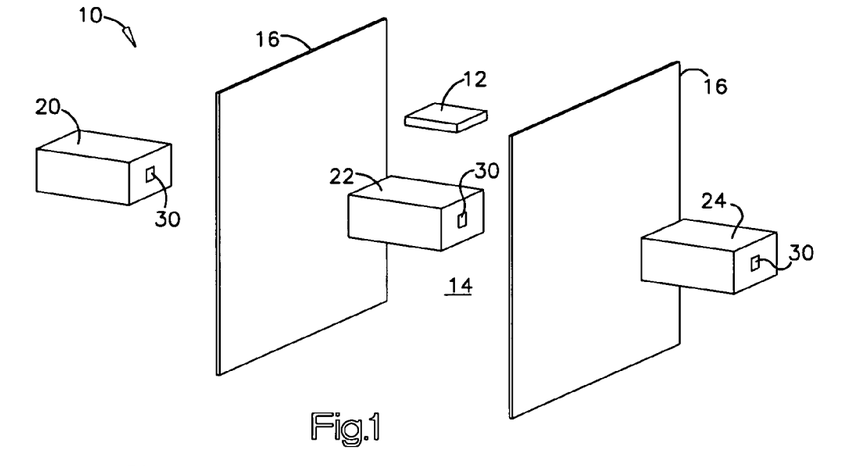
FIG. 1 is an oblique view of an RFID device detection system in accordance with the present invention.

Referring initially to FIG. 1, an RFID device detection system 10 includes an RFID device reader 12 for detecting RFID devices within a designated area 14. The system 10 also includes a jamming system 15 that includes a pair of jamming signal transmitters 16 for preventing detection by the RFID device reader 12 of RFID devices outside of the designated area 14. FIG. 1 shows three objects 20, 22, and 24, with each of the objects 20–24 having an RFID device 30 thereupon. The object 22 is within the designated area 14, and its RFID device 30 may thus interact with the RFID device reader 12, to be detected by and/or read by the RFID device reader 12. The objects 20 and 24, on the other hand, are outside of the designated area 14. For these objects, the jamming signal transmitters 16 prevent interaction between the RFID device reader 12 and the RFID devices 30 on the objects 20 and 24.

The detection of the RFID devices 30 by the RFID device reader 12 may be effected by transmission of a communication signal by the RFID device reader 12, and detection of a response by the RFID devices 30 within the designated area 14. A communication signal, as the phrase is used herein, refers to an electromagnetic signal propagating between the RFID device reader 12 and the RFID device 30. The communication signal may be received by the RFID device 30, and may trigger a response signal sent by the RFID device 30. The response may be an active response, which may include transmitting a response signal that may include, for instance, sending certain information stored in the RFID device 30. Alternatively the response signal transmitted by the RFID device 30 may only signal the presence of the RFD device 30. As another alternative, the RFID device reader 12 and the RFID device 30 may interact without explicit transmission of a signal by the RFID device 30, with the RFID device 30 thereby acting passively. For instance, the presence of the RFID device 30 in the designated area 14 may affect an electric field set up by transmission of the communication signal by the RFID device reader 12, with the RFID device reader 12 configured to detect the alteration of the electric field due to the presence of the RFID device 30. The communication signal used by the RFID device reader 12 for detecting the RFID devices 30 may have a higher frequency that jamming signals emitted by the jamming signal transmitters 16. However, it will be appreciated that the communication signal may have any of a variety of frequencies and/or strengths, some of which are discussed herein.

The phrase "designated area," as used herein, refers to a predetermined area where RFID devices are to be detected, interrogated, or read, and for which some discrimination is applied to inhibit or prevent detection of RFID devices outside of the designated area. A designated area may be a stationary area through which pass objects that have RFID devices coupled to them. Thus, for instance, the designated area may include a portion of a conveyor belt along which objects with RFID devices pass. As another example, a designated area may include a doorway or other portal through which pass objects with RFID devices. Alternatively, a designated area may be a movable area, such as a volume surrounding a portable RFID device reader flanked by portable jamming signal transmitters. Thus designated areas may be areas through which RFID devices coupled to objects move, or areas that are moved relative to such objects. In general, a designated area may have any reasonable shape, although it will be appreciated that simple shapes for the designated area may be more useful and easier in practice to achieve. For example, the designated area may be substantially a cube or a parallelepiped. The designated area may be configured to be a size that may correspond to the coverage of the RFID device reader.

The term "jamming signal transmitters," as used herein, refers to transmitters that prevent normal operation of an RFID chip or strap, by causing an electrical signal or other form of energy to be received by the chip or strap, so as to prevent coupling of the chip or strap with an antenna, to communicate with an RFID device reader. The electrical signal or other form of energy emitted by the jamming signal transmitters is referred to herein as a jamming signal. A jamming signal transmitter thus may cause electrical interference that prevents operation of the chip or strap, in conjunction with an antenna, to communicate with an RFID device reader. A jamming signal transmitter, as the term is used herein, is not a device that communicates with the RFID chip or strap, so as to send (for example) an informational signal to the chip or strap with instructions for the chip or strap to not respond to the RFID device reader. Thus transmitters that send coded signals to RFID devices, such as the signposts described in U.S. Pat. No. 6,542,114, are not "jamming signal transmitters" as the term is used herein. A jamming signal transmitter may therefore prevent detection or reading of an RFID device, by emitting a suitable non-informational signal, for example by amplitude modulation.

A jamming signal transmitter may utilize any of a variety of forms of energy to affect operation of the RFID chip or strap (interposer) in such a way so as to inhibit function of the RFID chip or strap in a localized way. One example of a suitable form of energy is low-frequency electromagnetic fields, such as from about 10 Hz to about 10 MHz. A loop antenna on the RFID device 30 may be used to convert such a magnetic signal into an electrical signal. In situations wherein the distance between the jamming signal transmitter and the RFID chip or interposer is small compared with the wavelength of the low-frequency electromagnetic field, such low-frequency electromagnetic fields may be well controlled. Such low-frequency electromagnetic fields may be generated by coil type antennas. Alternatively, low-frequency electromagnetic fields may be generated by charged plates.

Suitable optical energy may also be utilized by a jamming signal transmitter. Such optical energy may have wavelength from about 10 μm (microns) to about 10 nm. Optical energy may be suitably generated by a jamming signal transmitter, for example by use of a laser, and may be controlled utilizing suitable elements such as lenses. Suitable RFID devices may have operation affected by introduction of suitable intensities and/or wavelengths of optical energy. For example, the RFID device may have junctions of semiconductor material that are photosensitive. Such RFID devices may be affected in operation by optical energy, suitably modulated, at a frequency selected to interact with photosensitive junctions or other portions of the RFID device. It will be appreciated that it would be advantageous to have such optical energy be distinguishable from the optical energy not common to the environment in which the jamming signal transmitter is placed.

As another alternative in utilizing optical energy, suitable infrared (IR) energy may be utilized, for example by taking advantage of the property of silicon and other semiconductor materials of being relatively transparent to some varieties of IR energy. IR energy may therefore be delivered through an RFID chip back to a suitable structure within a chip.

Another alternative for the jamming signal transmitter is use of acoustic energy. As will be described in greater detail below, acoustic energy may be used to resonant a portion of an RFID device to cause change in device functionality. For example, a portion of a substrate of the device may be made of a piezoelectric material. Acoustic energy may be emitted by a jamming signal transmitter at a voltage and a frequency configured to resonate the piezoelectric material at points for which reading function of the RFID device is to be inhibited.

As will be described in greater detail below, the jamming signal transmitters 16 may be low-frequency field generator loops, driven opposite in phase to one another. The jamming signal transmitters 16 may combine to produce a jamming signal that renders the RFID devices 30 unreadable. More specifically, the RFID devices 30 may each include a loop antenna that interacts with a chip of the RFID devices 30 to put a voltage across contacts of the chip of the RFID device 30.

Figure 2:
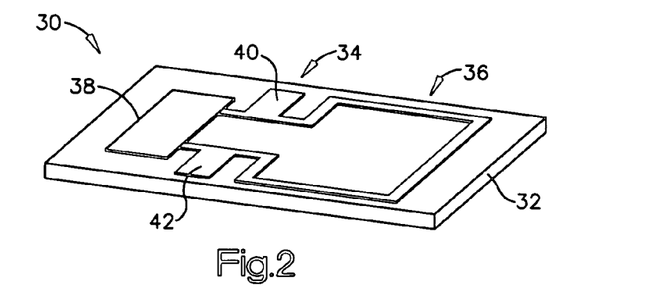
FIG. 2 is an oblique view of an RFID device in accordance with the present invention, that is selectively detectable by the RFID device detection system of FIG. 1.

FIG. 2 shows one example embodiment of the RFID device 30. The RFID device 30 includes a substrate 32 with a pair of antennas 34 and 36 thereupon. The antennas are attached to an RFID chip or strap 38. The RFID chip or strap 38 may be any of a variety of wireless communication devices for communicating with the RFID device reader 12.

The term "RFID device," as used herein, refers broadly to devices used in wireless communication. At a minimum, an RFID device includes an antenna and some sort of electrical or electronic elements (which may be included in a chip or a strap) coupled to the antenna. An RFID device may include its own power supply, such as a battery, or alternatively may draw power from an external electrical field, such as a field used to interrogate, read, or otherwise detect the RFID device. An RFID device may be a passive device, which may be detected, for example, by its effect on surrounding electrical or magnetic fields. Alternatively, an RFID device may be an active device, a device that actively sends signals. Signals sent by an active RFID device may include simple (non-informational) signals, merely indicating the presence of the RFID device, as well as more complicated signals, such as signals providing information regarding the RFID device and/or an object to which the RFID device is coupled.

An RFID device may be configured to interact with a suitable RFID device reader. The RFID device may have memory registers, for instance to store information regarding the device and/or the object to which it is coupled, for use in communicating with an RFID device reader.

The term "RFID devices" includes both RFID labels and RFID tags. RFID labels are RFID devices that are attached to the surface of an object, for example by use of an adhesive layer. RFID tags are RFID devices that are otherwise coupled to an object. RFID tags may be imbedded in an object, for example by being placed between layers of an object, or in a label of an object such as a garment. RFID devices may also be otherwise mechanically coupled to an object or a part of an object, for example being coupled to an object as a hangtag.

An RFID device may include additional layers beyond those discussed herein. For example, an RFID label may include an adhesive layer, such as a suitable pressure-sensitive adhesive layer, for use in adhering the RFID label to an object. The RFID device may also have other layers, such as protective layers, and/or a printable layer for printing information thereupon. It will be appreciated that the RFID device may also include additional suitable layers and/or structures, other than those mentioned herein.

The term "strap," as used herein, may refer to an integrated circuit (IC) chip, electrical connectors to the chip, and strap leads coupled to the electrical connectors. A strap also may include a strap substrate, which may support other elements of the strap, and may provide other characteristics such as electrical insulation. The strap may be elongate, as the strap leads extend from the IC chip. The strap may be flexible, rigid, or semi-rigid. It will be appreciated that a variety of strap configurations are available for coupling to the antennas 34 and 36. Examples include an RFID strap available from Alien Technology Corporation, and the strap marketed under the name I-CONNECT, available from Philips Electronics. The term "strap" broadly includes chip carriers such as interposers. Further disclosures of straps are found in U.S. Pat. No. 6,606,247, assigned to Alien Technology Corporation, and in U.S. Patent Publication No. 2003/0136503 A1.

Examples of suitable materials for the RFID device substrate and the strap substrate include, but are not limited to, high Tg polycarbonate, poly(ethylene terephthalate), polyarylate, polysulfone, a norbornene copolymer, poly phenylsulfone, polyetherimide, polyethylenenaphthalate (PEN), polyethersulfone (PES), polycarbonate (PC), a phenolic resin, polyester, polyimide, polyetherester, polyetheramide, cellulose acetate, aliphatic polyurethanes, polyacrylonitrile, polytrifluoroethylenes, polyvinylidene fluorides, HDPEs, poly(methyl methacrylates), a cyclic or acyclic polyolefin, or paper.

The antennas 34 and 36 may be suitable electrically-conductive materials on a substrate material. It will be appreciated that a wide variety of conductive materials and methods of formation may be utilized in fabricating the antennas 34 and 36. Suitable conductive materials include conductive metals, conductive inks, and conductive polymers. Suitable methods of deposition or formation include printing, plating, or adhesively adhering the conductive material to the substrate. For example, known printing methods such as ink jet printing, offset printing, and Gravure printing may be used to selective deposit conductive ink. Suitable plating may include a variety of known electroplating methods, for example electroplating on a thin layer of conductive material upon the substrate. Further, the conductive material may be deposited by other suitable methods, such as sputtering or various suitable vapor deposition methods. Selective removal processes such as etching may also be used in producing the desired configuration of conductive material.

The first antenna 34 may be an antenna suitable for communicating with the RFID device reader 12. The first antenna 34 may include a pair of antenna elements 40 and 42. The antenna elements 40 and 42 may be coupled to respective leads of the RFID strap or chip 38, to enable the strap or chip 38 to be detected by or otherwise engage in communication with the RFID device reader 12. The RFID device reader 12 may be configured to send signals or create a suitable UHF field for detecting and/or otherwise interacting with the RFID chip or strap 38. As discussed above, the interaction between the reader 12 and the RFID device 30 may passive or active.

The antenna elements 40 and 42 may be configured so as to receive and/or send appropriate relatively long-range signals. For example, the antenna elements 40 and 42 may be configured to receive and/or send signals at frequencies from about 400 MHz to about 3000 MHz, although it will be appreciated that the antenna elements 40 and 42 may be configured to send and/or receive signals at other frequencies, and that the antenna elements 40 and 42 may send and/or receive signals at other frequencies. The antenna elements 40 and 42 may be rectangular, or may be in any of a variety of other suitable shapes. The antenna elements 40 and 42 may be made of conductive ink, or other suitable materials printed or deposited upon the substrate 32. It will be appreciated that the first antenna 34 may have a variety of other suitable configurations, suitable for sending and/or receiving signals from the RFID device reader 12. Such alternative configurations may include a different number of antenna elements than that shown in FIG. 2, as well as different configurations of the elements. Such different antenna element configurations include adaptive antenna elements, which may compensate to some degree for the effect of conductive or dielectric objects in their vicinity by changing their characteristics in response to the presence of conductive and/or dielectric materials. Such adaptive elements are described in greater detail in U.S. Provisional Application No. 60/517,156, filed Nov. 4, 2003, which is hereby incorporated by reference in its entirety.

The second antenna 36 may be a loop antenna configured to produce a voltage across contact points of the chip or strap (interposer) 38 when a suitable low-frequency signal is received by the RFID device 30. A loop antenna, also referred to as a flat coil, converts received AC magnetic fields to a voltage across ends of the antenna. The voltage produced in a field of given strength is a function of the number of turns of the coil of the loop antenna, the enclosed area of the coil/loop, and the permeability of the material inside the coil/loop. The loop antenna will also produce a certain inductance. The second antenna 36 may be configured such that the inductance should be resonant with a capacitance provided by the RFID chip.

An example of low-frequency signals received by the second antenna 36 is a low-frequency magnetic field, for instance ranging from about 0.1 MHz to about 50 MHz. Such low-frequency magnetic fields have a controllable profile for the propagation of signals at ranges of several meters. Such signals may be produced using one or more coil antennas in the jamming signal transmitters 16. The low-frequency magnetic field signals mat be near-field signals that are almost entirely magnetic, with little distortion caused by metallic objects and virtually no effect by dielectric objects in the vicinity of a coil antenna used to produce the low-frequency magnetic field. The second antenna 36 may have a suitable number of turns for receiving low-frequency signals, such as the low-frequency magnetic field signal discussed above.

The antennas 34 and 36 may be coupled together in parallel. That is, antennas 34 and 36 may both be coupled to the same contacts of the RFID strap or chip 38. In this configuration, low-frequency jamming signals received by the second antenna 36 may be used to prevent communication with the strap or chip 38 via the first antenna 34. In one example embodiment, an input signal of 150 mV peak-to-peak, with a frequency of from 50 kHz to 500 kHz, was found to jam a strap or chip of an RFID device, thus rendering it unable to communicate. Jamming for such a strap or chip was also achieved at higher frequencies, for example, at 13.56 MHz, at higher input signal levels, for example with an approximately 2V peak-to-peak signal amplitude.

Thus, it will be appreciated that the jamming signal transmitter 16 described above may be configured to emit low-frequency signals at a frequency and strength suitable for jamming the strap or chip 38 of the RFID device 30. It will be appreciated that it will be desirable to configure the antennas 34 and 36 such that operation of the first antenna 34 in conjunction with the chip or strap 38, under suitable UHF signals of the RFID device reader 12 and where no substantial low-frequency jamming signals are present, is not substantially affected by the presence of the second antenna 36.

Having the jamming signal transmitters 16 on opposite sides of the designated area 14, and providing signals that are opposite in phase with one another, causes the signals from the jamming signal transmitters 16 to substantially cancel each other out between the jamming signal transmitters 16, that is, in the designated area 14. Objects, such as the objects 20 and 24, that are outside of but close to the designated area 14, receive relatively large signals from the jamming signal transmitters 16. The signals operate to provide sufficient strength to jam the RFID devices 30 on the objects 20 and 24. However, for RFID devices inside the designated area 14 (such as on the object 22), the signals from the jamming signal transmitters 16 cancel one another out to some extent due to the opposite phases of the signals from the jamming signal transmitters 16. Thus, objects such as the object 22 may be read within the designated area 14, even though they receive relatively large signals from each of the jamming signal transmitters 16, because the signals from the jamming signal transmitters 16 cancel one another out, at least to some extent. It will be appreciated that the combined signals from the jamming signal transmitters 16 may not fully cancel one another out within the designated area 14, while still being of insufficient strength, or lacking in other characteristics, to allow jamming of RFID devices within the designated area 14.

It will be appreciated that a greater or lesser number of the jamming signal transmitters 16 may be utilized, in order to allow jamming of RFID devices in any of a number of expected orientations. The jamming signal transmitters 16 may utilize coils of different shapes and drive phases to produce the desired readability within the designated area 14, while preventing reading of RFID tags outside of the designated area.

The jamming signal transmitters 16 may include multiple coil systems that operate in the same area, operating at different frequencies, to ensure the desired selective reading of the RFID devices 30. If the low-frequency field generated by the various jamming signal transmitters 16 is sufficiently strong, it may not be necessary to configure the second antenna to specifically be sensitive to a particular frequency generated by the low-frequency jamming signal transmitters 16.

It will be appreciated that the system 10 may be used in other ways than as described above. For example, it will be appreciated that the jamming signal transmitters 16 may be used to jam the RFID tags, as discussed above, but may also be usable to read other types of RFID devices. Different signals may be used for detecting and jamming different types of RFID devices.

Conversely, a system configured to read or otherwise detect one type of RFID device may be used to jam another type of RFID device. Though ranges of frequencies have been given herein for jamming signals and communication (detecting) signals, it will be appreciated that the frequency of the signals used for jamming and detecting varies a great deal, based upon the configuration of the RFID devices utilized.

Figure 3:
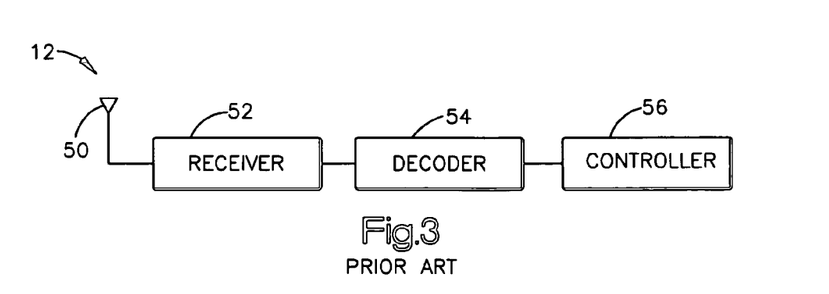
FIG. 3 is a schematic diagram of a prior art RFID device reader suitable for use in the RFID device detection system of FIG. 1.

Referring now to FIG. 3, a schematic diagram of the RFID device reader 12 is shown. It will be appreciated that the configuration shown in FIG. 3 is only one example of a wide variety of suitable configurations. The RFID device reader 12 includes an antenna 50, a UHF receiver 52, a decoder 54, and a controller 56. It will be appreciated that the components of the RFID device reader 12 may be suitably coupled together so as to receive signals or otherwise detect the RFID devices 30 within the designated area 14. In addition, it will be appreciated that the RFID device reader 12 may communicate information with the RFID devices 30, for example, exchanging information back and forth with the RFID devices 30. The RFID devices 30 may be configured to transmit information, which may be customized to individual objects, or to classes of objects.

Figure 4:
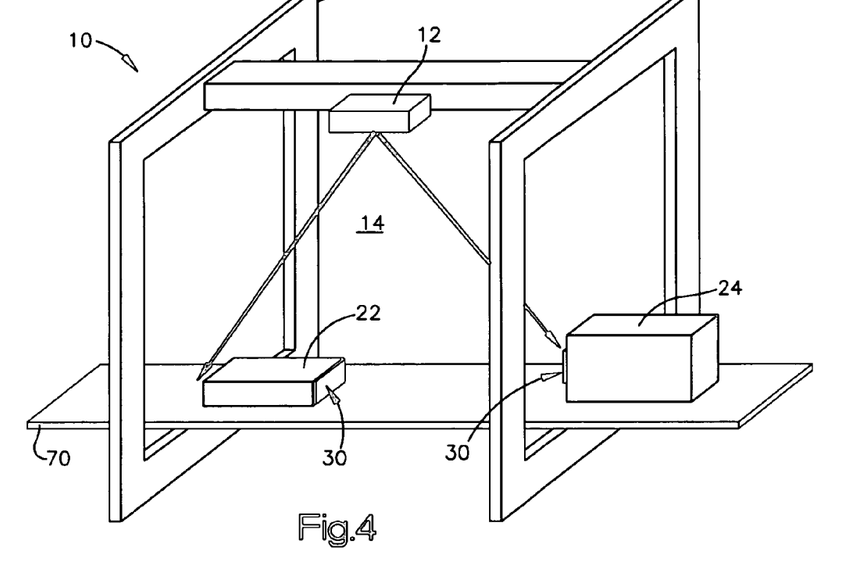
FIG. 4 is an oblique view of an example of an application of the RFID device detection system of FIG. 1.

One example of a configuration for deployment of the system 10 is shown in FIG. 4. There, the system 10 is installed in the vicinity of a conveyor, such as conveyor belt or a set of rollers 70. The size, shape, and location of the designated area 14 may be configured relative to the conveyor belt 70 such that the objects 22 and 24 are read one at a time as they move along the conveyor belt 70. The jamming signal transmitters 16 may be located relative to the expected facing of the objects 22 and 24 such that only one of the objects is within the designated area 14 at any one time. The system 10 shown in FIG. 4 may be part of a larger system involving multiple conveyor belts or other areas where objects having RFID devices coupled thereto, may be located. The system 10 may operate to exclude from consideration of the RFID device reader 12 not only other of the objects 22 and 24 on the conveyor belt 70, but also other objects on other conveyor belts, or in other areas within the vicinity of the RFID device reader 12.

Figure 5A:
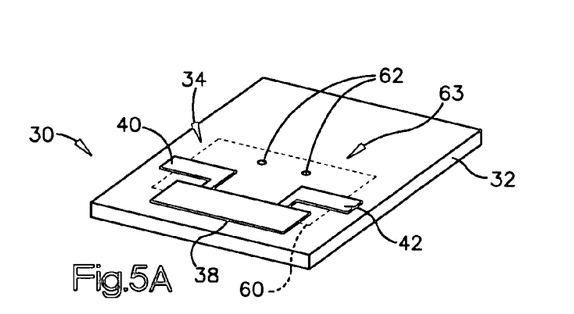
FIG. 5A is an oblique view of another embodiment RFID device in accordance with the present invention, an RFID device that utilizes piezoelectric material.

FIG. 5A shows an alternate embodiment of the RFID device 30. In the configuration shown in FIG. 5A, the substrate 32 has a piezoelectric portion 60. The piezoelectric portion 60 is configured such that, when it is excited by suitable resonant energy, the piezoelectric portion 30 creates an electrical signal across the strap or interposer 38 that interferes with the operation of the RFID device 30, and preventing the RFID device 30 from interacting with the RFID device reader 12. The piezoelectric portion 60 may have suitable layers, and suitable apertures 62 therein, so as to create a mechanically resonant element 63 that can mechanically respond to the resonant energy jamming signal, such as a suitable acoustic energy jamming signal. The apertures 62 may be any of a variety of suitable processes, such as die cutting. The piezoelectric portion 60 may include polyvinylidene fluoride (PVDF), suitably treated so as to make it piezoelectric. Another possible piezoelectric material is a suitable ceramic such as barium titanate.

It will be appreciated that the piezoelectric structure shown in FIG. 5A and described above may be considered an antenna, in that the piezoelectric structure is capable of transforming acoustic energy into an electric signal. The term antenna, as used herein, refers broadly to structures that convert radiation energy of whatever frequency to another type of energy, such as electrical energy or mechanical energy.

Figure 5B:
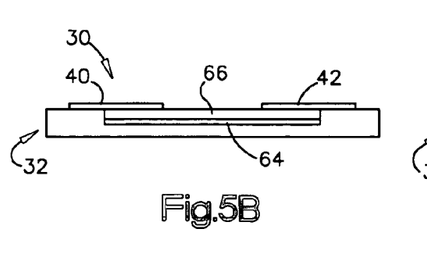
FIG. 5B is a cross-sectional view of another embodiment of the RFID device in accordance with the present invention, which includes a piezoelectric material.

FIG. 5B shows another piezoelectric embodiment of the RFID device 30. The embodiment of the RFID device 30 includes a substrate 32 with a piezoelectric material 64 topped by a magnetic material element 66, such as a magnetic material layer or bridge. The piezoelectric material 64 and the magnetic material element 66 may extend over part of a top surface of the substrate 32. An example of a suitable magnetic material is steel foil. The magnetic material element 66 may react to a suitable magnetic field by moving or deflecting, which in turn may cause an electric field to be produced by the piezoelectric material 64. The electric field produced by the piezoelectric field may jam the RFID device 30, preventing the RFID device 30 from interacting with the RFID device reader 12.

Figure 5C:
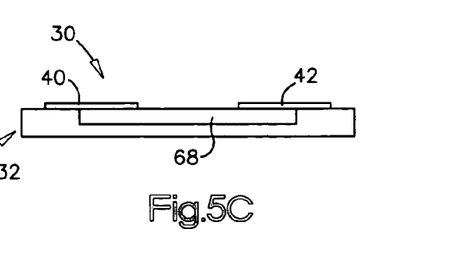
FIG. 5C is a cross-sectional view of still another embodiment RFID device in accordance with the present invention, an embodiment that includes a magnetic material.

FIG. 5C shows another alternative embodiment of the RFID device 30, which has a magnetic material element 68, such as a magnetic material layer or bridge, which is in contact with the antenna elements 40 and 42. In a suitable magnetic field, the magnetic material element 68 may move or deflect, affecting the tuning of the antenna elements 40 and 42, thereby hindering possible communication between the RFID device reader 12 and the RFID device 30. The varying of the tuning caused by the jamming magnetic signal may itself be controlled by controlling the frequency and/or amplitude of the jamming magnetic signal. The jamming magnetic signal may be configured to interact with the antenna elements 40 and 42, through the action of the magnetic layer or bridge 68, at a frequency prevents the chip or strap 38 from functioning so as to be in communication with the RFID device reader 12.

Figure 6:
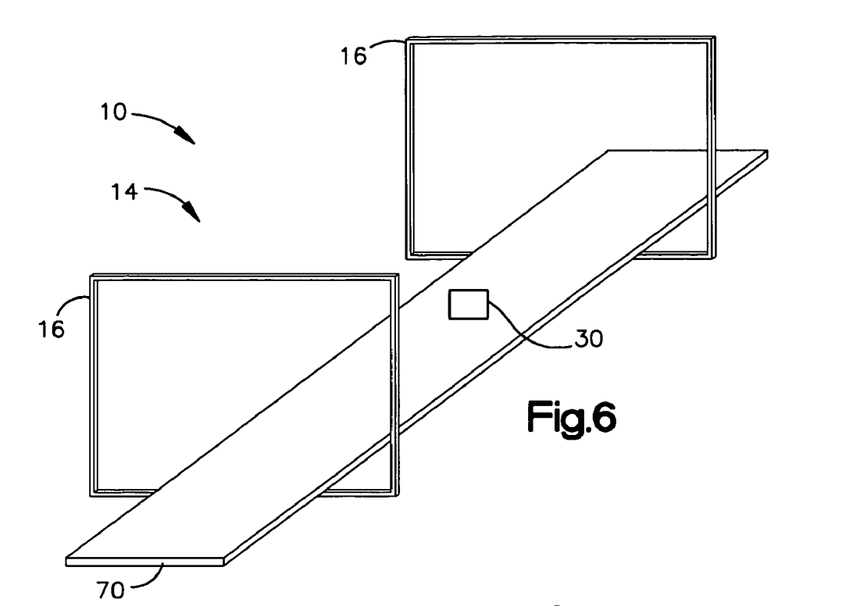
FIG. 6 is an oblique view of an RFID device detection system with a first configuration of jamming signal transmitters, in accordance with the present invention.
Figure 7:
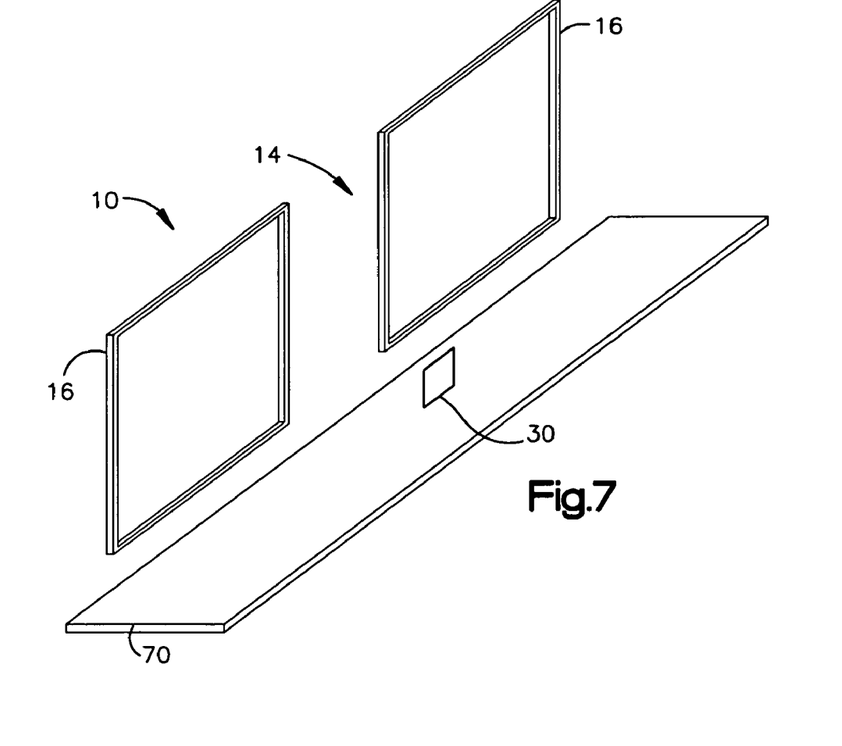
FIG. 7 is an oblique view of an RFID device detection system with a second configuration of jamming signal transmitters, in accordance with the present invention.
Figure 8:
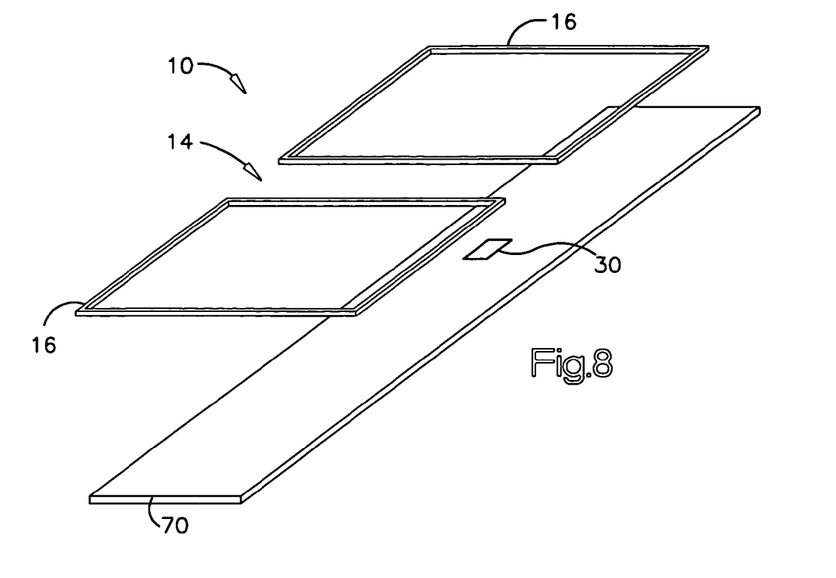
FIG. 8 is an oblique view of an RFID device detection system with a third configuration of jamming signal transmitters, in accordance with the present invention.

FIGS. 6–8 show various possible configurations of the jamming signal transmitters 16, for jamming various configurations of the RFID devices 30 outside of a designated area 14. The pairs of jamming signal transmitters 16 in the various configurations shown in FIGS. 6–8 may have antiphase signals.

FIG. 6 illustrates the jamming signal transmitters 16 configured substantially parallel to one another on opposite sides of a designated area 14, with a conveyor 70 running through the loops of both of the jamming signal transmitters 16. The jamming signal transmitters 16 are configured to allow an RFID device 30 in the designated area 14 to be read, while preventing reading of RFID devices that are outside of the designated area 14 and are substantially parallel to the loops of the jamming signal transmitters 16.

FIGS. 7 and 8 illustrates side-by-side sideways facing jamming signal transmitters 16 for jamming RFID devices 30 outside of a designated area 14 that are in a sideways-facing orientation. In FIG. 7 the jamming signal transmitters 16 oriented substantially parallel to and along a side of the conveyor 70. In FIG. 8, the jamming signal transmitters 16 are above the conveyor 70. As in the configuration shown in FIG. 6, the jamming signal transmitters 16 are configured to allow an RFID device 30 in the designated area 14 to be read, while preventing reading of RFID devices that are outside of the designated area 14 and are substantially parallel to the loops of the jamming signal transmitters 16.

Figure 9:
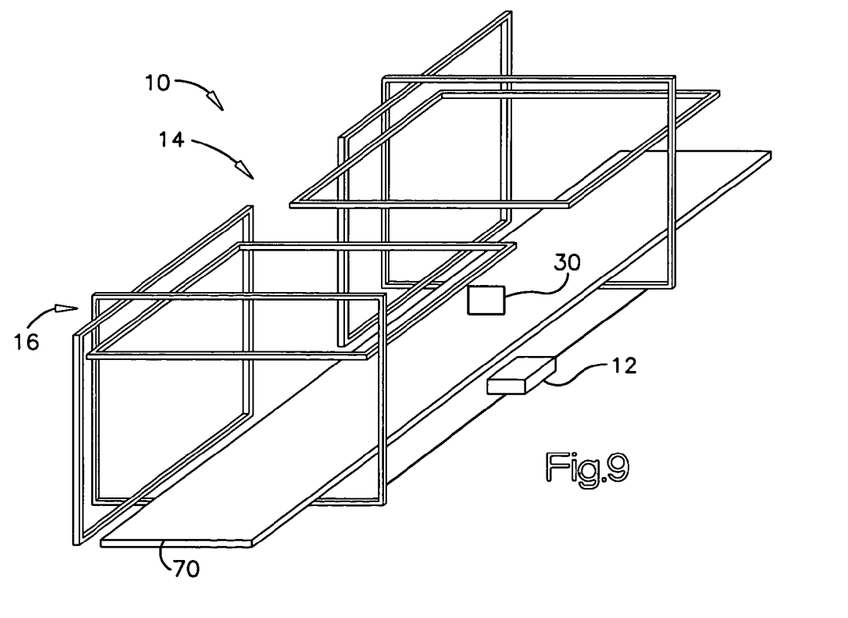
FIG. 9 is an oblique view of an RFID device detection system in accordance with the present invention, utilizing jamming signal transmitters in a variety of configurations for interacting with RFID devices in a variety of orientations.

The various orientations of jamming signal transmitters shown in FIGS. 6–8 may be combined so as to allow selective reading of RFID devices 30 in any of a variety of orientations, as is illustrated in the RFID device detection system 10 shown in FIG. 9. Coupling between an RFID device and the jamming signal transmitters 16 is inversely proportional the third power of the distance between the jamming signal transmitters 16 and the RFID device, and is proportional to the cosine of the relative angle of orientation between the RFID device and the jamming signal transmitters 16. For jamming signal transmitters 16 utilizing anti-phase signals in corresponding pairs of devices, there is a "null zone" in the middle of the designated area 14, where reading of RFID devices is substantially unaffected by the jamming signal transmitters 16, regardless of the relative orientations of the RFID devices and the jamming signal transmitters.

The jamming signal transmitters 16, in their various orientations, may be operably coupled to the RFID device reader 12 to coordinate operation of the reader 12 and the jamming signal transmitters 16. The pairs of jamming signal transmitters 16 may be sequentially switched, and may be switched in synchronization with operation of the reader 12. If the frequency selectivity of the RFID devices response to jamming signals is low, all of the jamming signal transmitters may be configured to emit signals simultaneously, as the beat frequencies caused by the signals interacting in the front end of an RFID chip will not affect jamming capability.

Another possible method of operation of the system 10 is to search for RFID devices electronically, with the purpose for the system 10 isolating a single RFID device in the designated area 14, while inhibiting reading of other RFID devices not in the designated area 14. The reader 12 may be able to rapidly tell if it has more than one RFID device is responding. When more than one RFID device is detected by the reader 12, the system 10 may be configured to activate the jamming signal transmitters 16 to jam one of the devices detected. Alternatively or in addition, characteristics of the signal(s) emitted by the jamming signal transmitters 16 may be configured so as to achieve the desired differentiation in reading the RFID devices. For example, the phase and/or amplitude of jamming signals may be varied. It will be appreciated that the reader 12 may be utilized in aiding in configuring the signal(s) emitted by the jamming signal transmitters 16, for example by providing feedback used in determining how to configure the signal(s), and/or when to stop re-configuring the signal(s).

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A radio-frequency identification (RFID) device comprising:
   a chip; and
   first and second antennas operatively coupled to the chip;
   wherein the antennas are configured to receive signals of different frequencies;
   wherein the first antenna is configured to receive relatively-high-frequency signals from an RFID reader;
   wherein the second antenna is configured to receive relatively-low-frequency jamming signals; and
   wherein the chip and the antennas are configured such that when the low-frequency jamming signals are received, communication between the RFID device and the RFID reader is prevented.

2. The device of claim 1, wherein the antennas are coupled to the chip in parallel.

3. The device of claim 1, wherein the second antenna is configured to receive low-frequency magnetic signals.

4. The device of claim 1, wherein the first antenna has a pair of antenna elements.

5. The device of claim 4, wherein the antenna elements are substantially rectangular.

6. The device of claim 1, wherein the second antenna is a loop antenna.

7. The device of claim 1, wherein the chip is part of a strap that is operatively coupled to the antennas.

8. The device of claim 1, wherein one of the antennas includes a piezoelectric material.

9. The device of claim 8, wherein the piezoelectric material is part of a mechanically resonant element that is mechanically coupled to the other of the antennas.

10. The device of claim 8, wherein the piezoelectric material is mechanically coupled to a magnetic material element.

11. The device of claim 1, wherein one of the antennas includes a magnetic material element that is mechanically coupled to the other of the antennas, whereby exposure of the magnetic material element to a magnetic field affects the tuning of the other of the antennas.

12. A system for detecting radio-frequency identification (RFID) devices, the system comprising:
   an RFID device reader for detecting the RFID devices within a designated area; and
   a pair of jamming signal transmitters on opposite sides of the designated area, to prevent detection of RFID devices outside of the designated area;
   wherein the jamming signal transmitters include a pair of low-frequency field generators; and
   wherein the generators generate low-frequency signals in opposite phase relative to one another.

13. The system of claim 12, wherein the jamming signal transmitters are on opposite sides of the RFID device reader.

14. The system of claim 13, wherein the jamming signal transmitters are substantially along boundaries of the designated area.

15. The system of claim 12, wherein the low-frequency signals are magnetic field signals.

16. The system of claim 12, wherein the low-frequency signals include signals having a frequency from 0.1 to 50 MHz.

17. The system of claim 12, wherein the generators substantially prevent detecting of RFID devices not between the generators.

18. The system of claim 12, wherein the designated area is an area through which pass objects that have the RFID devices coupled to them.

19. The system of claim 18, wherein the designated area is an area that includes a conveyor.

20. The system of claim 12, further comprising an additional pair of jamming signal transmitters.

21. The system of claim 20, wherein the pairs of jamming signal transmitters are oriented differently relative to one another.

22. The system of claim 21, wherein one of the pairs of jamming signal transmitters is oriented substantially perpendicular to the other pair of jamming signal transmitters.

23. The system of claim 21,
   wherein the jamming signal transmitters of one of the pairs of jamming signal transmitters are located on opposite respective sides of the designated area; and
   wherein the jamming signal transmitters of the other of the pairs of jamming signal transmitters are both located in a side-by-side relationship on another side of the designated area.

24. The system of claim 12, wherein the jamming signal transmitters emit optical energy.

25. The system of claim 12, wherein the jamming signal transmitters emit infrared energy.

26. The system of claim 12, wherein the jamming signal transmitters emit acoustic energy.

27. The system of claim 12, wherein the reader is operatively coupled to the jamming signal transmitters.

28. A method for selectively detecting radio-frequency identification (RFID) devices, the method comprising:
   using jamming signal transmitters to inhibit operation of RFID devices outside of a designated area; and
   detecting RFID devices within the designated area;
   wherein the using the jamming signal transmitters includes generating low-frequency signals from a pair of low-frequency field generators on opposite sides of the designated area; and
   wherein the generating includes generating low-frequency signals from one of the generators that is opposite in phase to low-frequency signals of the other of the generators.

29. The method of claim 28, wherein the generating includes generating signals having a frequency from 0.1 to 50 MHz.

30. The method of claim 28, wherein the generating includes emitting non-informational signals form the field generators.

31. The method of claim 28, wherein the detecting includes using an RFID device reader to detect the RFID devices.

32. The method of claim 31, wherein the reader is at least partially within the designated area.

33. The method of claim 31, wherein the jamming signal transmitters are on opposite sides of the reader.

34. The method of claim 28, wherein the using the jamming signal transmitters includes using an additional pair of jamming signal transmitters, wherein the additional devices are in a side-by-side configuration on an additional side of the designated area.

35. The method of claim 28, wherein the using the jamming signal transmitters includes using jamming signal transmitters in a side-by-side configuration on a side of the designated area.

36. The method of claim 28, wherein the using the jamming signal transmitters includes having the jamming signal transmitters emit optical energy.

37. The method of claim 28, wherein the using the jamming signal transmitters includes having the jamming signal transmitters emit infrared energy.

38. The method of claim 28, wherein the using the jamming signal transmitters includes having the jamming signal transmitters emit acoustic energy.

39. The method of claim 38, wherein the using the jamming signal transmitters further includes exciting a piezoelectric material of the RFID device.

40. The method of claim 28, wherein the using the jamming signal transmitters includes using a magnetic jamming signal to move a magnetic material that is part of the RFID device.

* * * * *